(12) United States Patent
Stott et al.

(10) Patent No.: US 6,317,473 B1
(45) Date of Patent: Nov. 13, 2001

(54) DEMODULATING DIGITAL VIDEO BROADCAST SIGNALS

(75) Inventors: Jonathan H. Stott, Tadworth; Justin Mitchell, Crawley; Christopher K. P. Clarke, Reigate; Adrian P. Robinson, London; Oliver Haffenden, Tooting, all of (GB); Philippe Sadot, Velizy Villacoublay (FR); Regis Lauret, Velizy Villacoublay (FR); Jean-Marc Guyot, Velizy Villacoublay (FR)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/071,401

(22) Filed: May 1, 1998

(30) Foreign Application Priority Data

| May 2, 1997 | (GB) | ................................................. 9709063 |
| Dec. 22, 1997 | (GB) | ................................................. 9727112 |
| Dec. 22, 1997 | (GB) | ................................................. 9727113 |

(51) Int. Cl.[7] .................................................. H04L 27/06
(52) U.S. Cl. ........................................ 375/344; 375/362
(58) Field of Search .................................... 375/326, 362, 375/329, 340, 344, 345, 316, 332, 281; 455/139, 136, 161, 164, 182.1, 182.2, 188.3, 192.2, 257, 263; 329/304, 307, 325; 370/480, 498, 503

(56) References Cited

U.S. PATENT DOCUMENTS 5,440,587 * 8/1995 Ishikawa et al. ..................... 375/332
5,487,186 * 1/1996 Scarpa ................................. 455/192.2
6,023,491 * 2/2000 Saka et al. ............................ 375/326

* cited by examiner

*Primary Examiner*—Chi Pham
*Assistant Examiner*—Emmanuel Bayard
(74) *Attorney, Agent, or Firm*—Oppenheimer Wolff and Donnelly

(57) ABSTRACT

In order to correct for common phase error in demodulated digital video broadcast signals which comprise data modulated on a multiplicity of spaced carrier frequencies, a demodulator includes analog to digital conversion means (20) for providing a series of digital samples of the broadcast signal, real to complex conversion means (22) for converting each digital sample to a complex number value, Fourier Transform means (24) for analysing the complex number values to provide a series of data signal values in complex number format for each carrier frequency, and signal processing means for processing the series of data signal values including phase error correcting means (30), the phase error correcting means including means for converting the data signal values from a complex number format to a phase angle format, means for determining a common phase error by assessing the phase of continual pilot signals in the broadcast signals and determining the variation in phase of the continual pilot signals between consecutive symbols in the broadcast signals, and means for subtracting the common phase error from the data signal values.

18 Claims, 4 Drawing Sheets

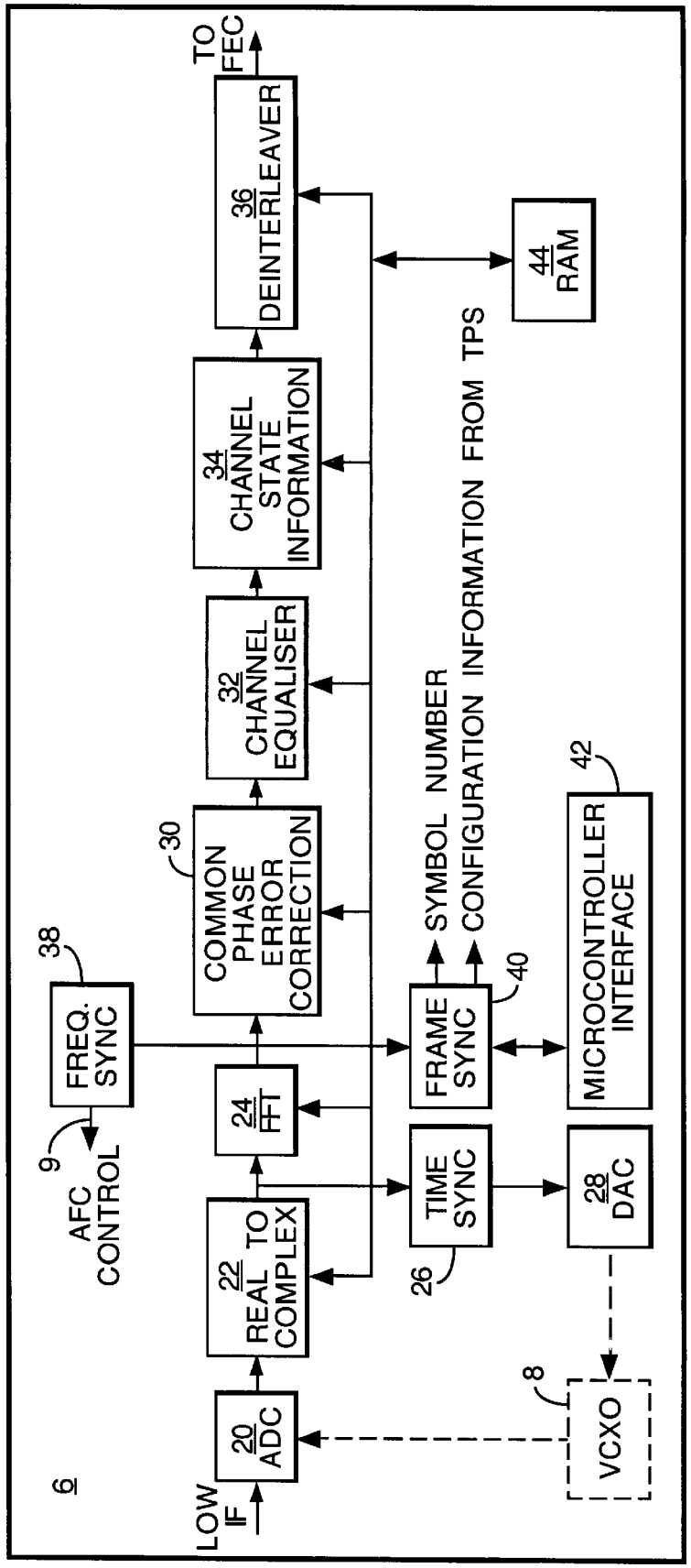

DEMODULATING DIGITAL VIDEO BROADCAST SIGNALS

This invention relates to demodulating digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath and co-channel interference, for example. A type of transmission which has been developed to meet these problems is known as Coded Orthogonal Frequency Division Multiplexing (COFDM)—see for example "Explaining Some of the Magic of COFDM" Stott, J. H.—"Proceedings of 20th International Television Symposium", Montreux, June 1997. In COFDM, transmitted data is transmitted over a large number of carrier frequencies (1705 or 6817 for DVB), spaced (by the inverse of the active symbol period) so as to be orthogonal with each other; the data is convolutionally coded, to enable soft-decision (Viterbi) decoding. Metrics for COFDM are more complex than those single carrier modulation in that they include Channel State Information (CSI) which represents the degree of confidence in each channel for reliably transmitting data.

Modulation and Demodulation of the carriers may be carried out by a Fast Fourier Transform (FFT) algorithm performing Discrete Fourier Transform operations.

Subsequent to demodulation, signal processing corrections are carried out such as channel equalisation, channel state information correction, and phase error correction. The demodulated and corrected signal may then be decoded in an FEC (forward error correction decoder) for recovery of data.

In regard to phase error correction, a principal problem is that of local oscillator phase-noise. The addition of local oscillator phase noise to an COFDM signal has two notable effects;

1) To rotate the received constellation by an amount which is the same for all the carriers within any one OFDM symbol, but varying randomly from symbol to symbol. This is called the Common Phase Error (CPE), and primarily results from the lower-frequency components of the phase-noise spectrum; and 2) To add Inter-Carrier Interference (ICI) of a random character similar to additive thermal noise. ICI primarily results from the higher-frequency components of the phase-noise spectrum. ICI cannot be corrected and must be allowed for in the noise budget. It can be kept small in comparison with thermal noise by suitable local oscillator design.

It is an object of the present invention to provide an improved means of removing the common phase error in digital video broadcast signals.

The present invention provides in a first aspect, apparatus for demodulating digital video broadcast signals comprising data modulated on a multiplicity of spaced carrier frequencies, including:

analog to digital conversion means for providing a series of digital samples of the broadcast signal, real to complex conversion means for converting each digital sample to a complex number value, Fourier Transform means for analysing the complex number values to provide a series of data signal values in complex number format for each carrier frequency, and signal processing means for processing the series of data signal values including phase error correcting means, the phase error correcting means including means for converting the data signal values from a complex number format to a phase angle format, means for determining a common phase error by assessing the phase of continual pilot signals in the broadcast signals and determining the variation in phase of the continual pilot signals between consecutive symbols in the broadcast signals, and means for subtracting the common phase error from the data signal values.

In accordance with the invention, an improved means is provided for accurately demodulating digital video broadcast signals which relieves the necessity for a very accurate down-conversion of the received broadcast signal to intermodulate frequencies.

As preferred, a plurality of said continual pilot signals (there are 45 or 177 available) are arranged to determine the phase error. In addition, a weighting means is employed to give more significance in the averaging process of those values near the average.

In a further aspect, the invention provides an apparatus for demodulating digital broadcast signals comprising data modulated on a multiplicity of spaced carrier frequencies, including:

analog to digital conversion means for providing a series of digital samples of the broadcast signal, Fourier Transform means for analysing the samples to provide a series of data signal values for each carrier frequency, and signal processing means for processing the series of data signal values including phase error correcting means, the phase error correcting means including, means for determining a common phase error by assessing the phase of continual pilot signals in the broadcast signals and determining the variation in phase of the continual pilot signals between consecutive symbols in the broadcast signals, and means for subtracting the common phase error from the data signal values, wherein the common phase error determining means includes means for averaging the phase of a plurality of said continual pilot signals, and weighting means for applying a weighting to the pilot signals so that more significance is accorded to pilot signals near the average value of phase error.

Thus, it is possible to remove the common phase-error component caused by phase noise added in the down-converter by digital processing in the chip. This processing is performed by the common-phase-error correction block in the architecture.

The common-phase-error correction block is able to remove the common phase error because all carriers within a given symbol suffer the same common phase error. By measuring the continual pilots, whose intended phase is the same from symbol to symbol, the common phase error is determined and then subtracted from the phase of all the data cells in the same symbol. There are sufficient continual pilots (which in any case are transmitted with a power approx. 2.5 dB greater than data cells) that the effect of thermal noise on this measurement can be rendered negligible by averaging. There are essentially three components required to implement common-phase-error correction in the chip. These are:

1) A one-symbol data delay; since the common phase error varies randomly from symbol to symbol, it must be applied to the symbol from which it was calculated. Furthermore, it is not possible to calculate the common phase error until the whole symbol has been received.

2) The digital circuitry required to calculate the common phase error based on the received data.

3) A phase-to-complex-number look-up table. This is required since the common phase error value that is calculated will be a phase value. In order to apply the correction to the signal, the signal must be multiplied by a complex number equal to the complex representation of the phase.

These three factors, which together form the "cost" of implementing the feature on the chip, must be balanced against the cost of improving the performance of the down-converter so that the phase-noise it introduces is negligible. In our architecture we decided that the cost of including a common phase error correction circuit was substantially less than the cost of eliminating phase-noise in the down-converter, and so the chip includes circuitry to perform common-phase-error correction.

Naturally, strict control is required over the frequencies of the incoming video signals, and to this end automatic frequency control (AFC) is desirable. An AFC signal is preferably derived from the series of data signal values output from the Fourier Transform means, either for control of analog intermediate frequency local oscillator in a down conversion stage, or for digital phase adjustment via a direct digital frequency synthesis (DDFS) unit applied to the input of the Fourier Transform device.

The AFC preferably comprises two parts, a coarse frequency control for providing an integral number of frequency spacings offset, and a fine frequency control for controlling the frequency to less than one spacing.

It has been realised in accordance with the invention, that as regards fine frequency control, the situation is similar to common phase error correction in that a small frequency error is equivalent to a gradually increasing phase error; thus in accordance with the invention the means employed for common phase error correction is also employed for fine AFC.

Accordingly, the present invention provides in a further aspect, apparatus for demodulating digital video broadcast signals comprising data modulated on a multiplicity of spaced carrier frequencies, including:

analog to digital conversion means for providing a series of digital samples of the broadcast signal, Fourier Transform means for analysing the samples to provide a series of data signal values for each carrier frequency, signal processing means for processing the series of data signal values including phase error correcting means, and automatic frequency control means for controlling the frequency of the signals input to the Fourier Transform means, wherein both the phase error correcting means and the automatic frequency control means employ a common phase error determination means comprising means for assessing the phase of a plurality of continual pilot signals in the broadcast signals and determining the variation in phase of the continual pilot signals between consecutive symbols in the broadcast signals in order to derive a common phase error and a frequency error signal.

Thus, the frequency control employs variation in phase between consecutive symbols (a first difference) for fine frequency control; the changing of such variation (a second difference) is employed for coarse frequency control.

BRIEF DESCRIPTION OF THE DRAWINGS

A preferred embodiment of the invention will now be described with reference to the accompanying drawings, in which:

FIG. 2 is more detailed block diagram of demodulating apparatus according to the invention forming part of the converter of FIG. 1;

DESCRIPTION OF THE PREFERRED EMBODIMENTS

The preferred embodiment of the present invention comprises a front end for digital terrestrial television transmitted according to the DVB-T specification. The front end consists of two separate components. First, an analog down-converter that converts the input signal from UHF to a low IF. Second, an integrated circuit that accepts the analog signal from the down-converter and performs the required DSP operations, which include synchronisation and demodulation, to form a stream of soft decisions suitable for presentation to an FEC decoder (Forward Error Correction decoder).

Full compliance to the DVB-T specification means that the chip is capable of decoding signals transmitted in the following modes:

1) A signal that contains either 1705 or 6817 active carriers, commonly referred to as 2K and 8K respectively. The chip includes the functionality and memory required to perform the FFT algorithm in both modes.

2) Non-hierarchical QPSK, 16-QAM and 64-QAM constellations.

3) Hierarchical 16-QAM and 64-QAM constellations, either uniform or non-uniform with the possible scale factors $\alpha=2$ and $\alpha=4$.

4) Guard intervals ¼, ⅛, 1/16 and 1/32 of the OFDM symbol length.

5) Viterbi code rates ½, ⅔, ¾, ⅚ and ⅞.

Figure 1:
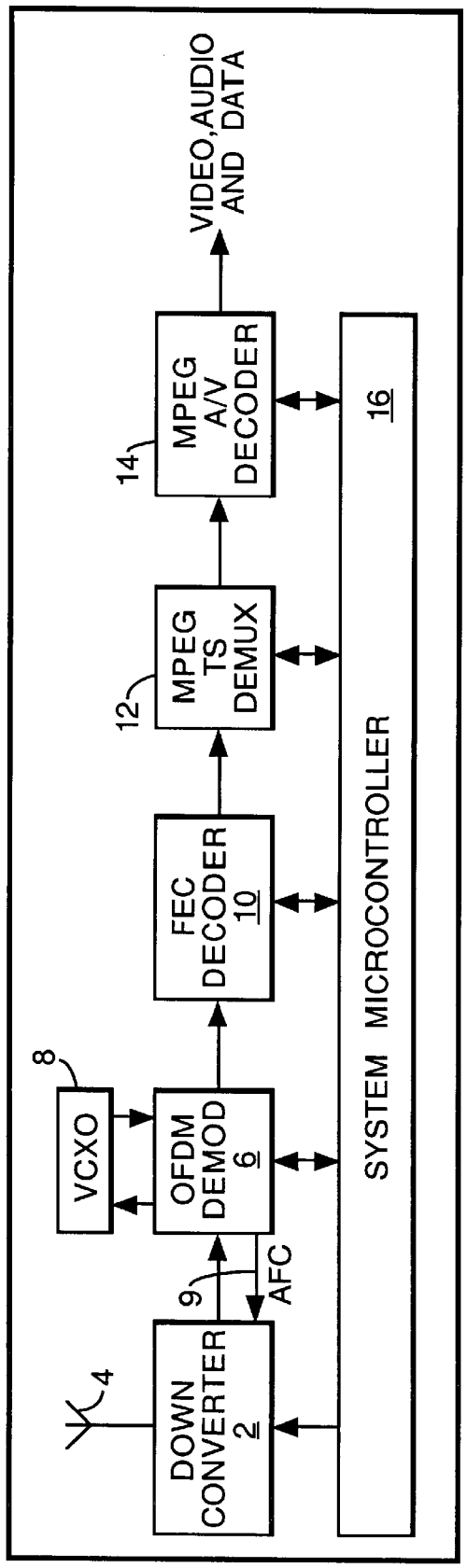
FIG. 1 is a schematic block diagram of digital terrestrial front end converter incorporating the present invention.

Referring now to FIG. 1, a block diagram of the front end system, a down-converter 2 receives the input UHF broadcast signal from an antenna 4 and converts the carrier signal to a first IF frequency of 30–40 MHz and then to a second IF frequency of 4.57 MHz. Since the bandwidth of the modulated data is about 7.6 MHz, this second IF signal is sufficiently low in frequency to present the signal as a base band signal to a demodulator chip 6. Demodulator chip digitises the incoming signal at a rate determined by a voltage controlled oscillator 8, and provides an Automatic Frequency Control on a line 9 to down-converter 2. The output of demodulator 6 represents demodulated data and is fed to a FEC decoder 10 (Forward Error Correction or Viterbi decoder) for recovering the data. The decoded data is fed to a transport stream demultiplexer 12 and then to an audio-visual decoder 14. The front end is controlled by a system microcontroller 16.

Figure 3:
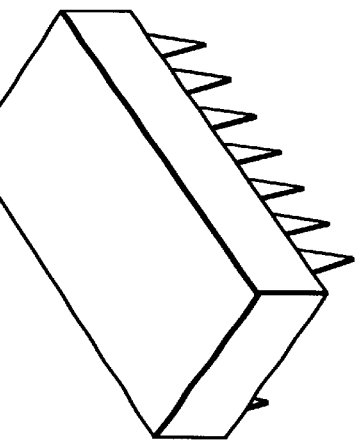
FIG. 3 is a schematic view of a chip incorporating the apparatus of FIG. 2.
Figure 4:
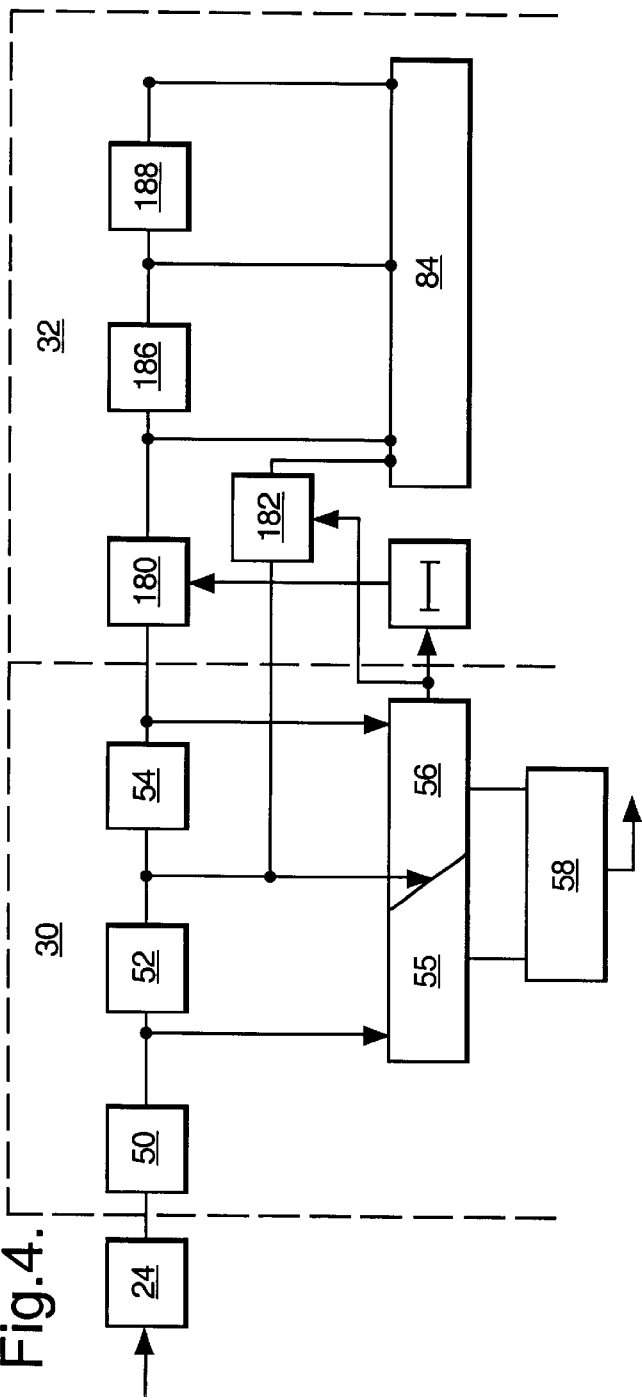
FIG. 4 is a more detailed block diagram of a common phase error/AFC current together with a channel equaliser circuit.

Referring now to FIG. 2, this shows the demodulator chip 6 in more detail. The chip itself is shown schematically in FIG. 3. The low second IF is fed to an analog digital converter which samples the IF signal at a frequency of 18.29 MHz (×4 the second IF frequency of 4.57 MHz), in an analog to digital converter 20. The digital output samples are fed to a real to complex converter 22 which converts the digital samples to complex number values in order to provide a complex signal centred on zero frequency. This signal is fed to a Fast Fourier Transform device (FFT) 24 and to a timing synchronisation unit 26 which derives a value from the complex input signal which is fed to a digital to analog converter 28 to supply an analog control voltage to a voltage controlled oscillator 8, which provides a sampling clock signal to analog to digital converter 20.

The FFT device 24 has four modes of operation. Firstly, it is capable of performing either a 2048 point or an 8192 point transform. Second, it is capable of performing the transform in either direction. The inverse FFT functionality is provided so that the integrated circuit may be used in applications requiring OFDM modulation. In any event, the FFT performs a series of discrete Fourier transforms on each carrier frequency to provide at an output the data symbols for each carrier frequency. These output signals are corrected in phase at a common phase error generator unit 30 and then passed to a channel equaliser 32, a channel state information correction unit 34 and a deinterleaver 36. The signal thus processed is then passed at an output from the demodulator to forward error correction unit 8. The phase error correction block 30 calculates the common phase error of the signal and applies the necessary correction. The channel equaliser 32 first performs linear temporal equalisation followed by frequency equalisation using a high order interpolating filter. The equaliser outputs an equalised constellation to the channel state information unit 34. Unit 34 generates 3 or 4 bit soft decisions which are suitable for presentation to a Viterbi decoder. Deinterleaver 36 performs firstly symbol deinterleaving followed by bit deinterleaving.

In addition, the output signals from FFT 24 are passed to a frequency synchronisation unit 38 and converts it to a control signal for automatic frequency control, which acts upon a local oscillator in down-converter unit 2 for adjusting the frequency of the first or second IF.

In addition, the output of FFT 24 is fed to a frame synchronisation unit 40 which is fed forward to units 10, 12 and 14 of FIG. 1. A microcontroller interface 42 is provided, and in addition RAM memory 44 is provided to which all the units 22, 24, 30–36 have access to in order to provide their required operations.

Analog Versus Digital AFC

One of the processes that is required in the synchronisation of the demodulator is to obtain frequency synchronisation. There is a choice as to whether to apply the required frequency shift as an analog correction in the down-converter 2, or as a digital frequency shift in the demodulator chip.

Analog Frequency Correction

If the frequency correction is implemented by adjusting the frequency of the reference crystal in the down-converter 2 then a control signal on line 9 is provided from the output of the integrated circuit 6 back to the down-converter. This method has the advantage that a SAW filter inside the down-converter can be made as narrow as possible. The disadvantages are twofold. First, the integrated circuit must pass a control signal back to the down-converter. Second, the architecture of the down-converter is made more complicated since the control signal must adjust the reference crystal within the search range of the AFC.

Digital Frequency Correction

If the frequency correction is implemented in the integrated circuit 6, then the architecture of the down-converter 2 is made much simpler since there is no longer any need to have a control signal from the chip 6, and the loop in the down-converter that drives the reference crystal is no longer required. The disadvantage of this method is that the bandwidth of the SAW filter must be increased by the AFC search range. This causes a significant penalty in terms of the adjacent channel protection ratio when the receiver is used in an environment where the existing analogue services are operated in adjacent channels to digital services. The architecture described will permit both analog and digital correction.

As regards common phase error correction, this is in practice combined with generation of the control signal in unit 38 for automatic frequency control. Both measurements are based on the phase rotation between one symbol and the next, measured on the continual pilots (CP's).

If a constant AFC error is present, there will be a constant change of rotation between successive symbols, proportional to the frequency error. Low frequency phase-noise will have a similar effect; rotating all of the carriers by the same angle, but this angle will vary from symbol to symbol in a random manner. In both cases it is desirable to attempt to correct the phase error on the current symbol by applying the opposite phase rotation to all carriers—this process is known as common-phase-error correction.

In addition to the phase rotation effect, an AFC error will also cause inter-carrier interference (ICI) which cannot be corrected for—for this reason it is also necessary to feed back an error signal to drive the frequency error to zero. This error signal can be applied to either in the analog domain as the local-oscillator control voltage, or in the digital domain to a DDFS which must be situated before the FFT. In either case an appropriate loop filter is included.

The measurement of phase rotations can only resolve AFC errors of up to roughly one half of the carrier spacing in either direction. In practice, during acquisition the AFC error is likely to be much greater than this. For this reason the AFC measurement also includes a "coarse" part, which measures the number of whole carriers by which the frequency is wrong. This is done using a pattern-matching approach looking for the continual pilots.

Referring to FIGS. 4 to 7, the output from FFT unit 24, in complex number representation is converted to a phase angle representation in converter unit 50.

The incoming data are denoted by c(l,n) where l is the symbol number and n is the slot number within the symbol. Note that this is not the same as the carrier number k, because this block must start processing before the nominal position of the first carrier to allow for a coarse frequency error.

The incoming complex values are converted to phase:

$$\theta(l, n) = \frac{1}{2\pi} \arg[c(l, n)]$$

where the argument function is defined such that $-\pi \leq \arg(z) < \pi$. c(l,n) is also delayed by one and two symbols and converted to phase to give $\theta(l-1,n)$ and $\theta(l-2,n)$ in delay elements 52, 54.

The first difference of phase is calculated for the current and previous symbols in subtractor units 55, 56.

$$\phi(l,n) = [\theta(l,n) - \theta(l-1,n)] \bmod 1.0$$

$$\phi(l-1,n) = [\theta(l-1,n) - \theta(l-2,n)] \bmod 1.0$$

The second difference is also calculated in further subtractor unit 58.

$$\psi(l,n) = [\phi(l,n) - \phi(l-1,n)] \bmod 1.0$$

The differences are calculated modulo 1.0, i.e. they are all between −0.5 and +0.5.

Fine AFC Measurement

This measurement assumes that the pilots are in the correct slots, i.e. that the AFC error is less than half of the carrier spacing. First an unweighted sum of the first differences is formed, over all of the continual pilots, in accumulator 60 (see FIG. 5).

$$\Phi_u(l) = \sum_{(n-N_0) \in C} \phi(l, n)$$

where C is the set of continual pilot positions defined in table 9 of the DVB-T specification, and $N_0$ is the slot number for the first carrier. This sum is divided in divider unit 62 by the number of CP's to give the average phase rotation:

$$\phi_u(l) = \frac{\Phi_u(l)}{N_{CP}}$$

where $N_{CP}$ is the number of continual pilots, i.e. 45 in 2K mode and 177 in 8K mode. Now a weight average is calculated. Firstly, the deviation of each pilot from the unweighted means is calculated in subtractor 64:

$$\epsilon(l,n) = |\phi(l,n) - \phi_u(l)|$$

A weight is derived based on the deviation measure from look-up table 66:

$$w(l, n) = \begin{cases} 0 & \epsilon(l, n) \geq 2^{-3} \\ 2 & 2^{-4} \leq \epsilon(l, n) < 2^{-3} \\ 8 & 2^{-5} \leq \epsilon(l, n) < 2^{-4} \\ 32 & 2^{-6} \leq \epsilon(l, n) < 2^{-5} \\ 64 & 2^{-7} \leq \epsilon(l, n) < 2^{-6} \\ 128 & \epsilon(l, n) < 2^{-7} \end{cases}$$

The weighted sum is now formed in a barrel shifter 68 and accumulator 70:

$$\Phi_w(l) = \sum_{(n-N_0) \in C} w(l, n) \phi(l, n)$$

The sum of the weights is also calculated in accumulator 72:

$$W(l) = \sum_{(n-N_0) \in C} w(l, n)$$

The weighted sum is divided in divider 74 by the sum of the weights to give the weighted mean:

$$\phi_w(l) = \frac{\Phi_w(l)}{W(l)}$$

This forms the fine part of the AFC measurement, and also the common-phase-error difference estimate.

Figure 6:
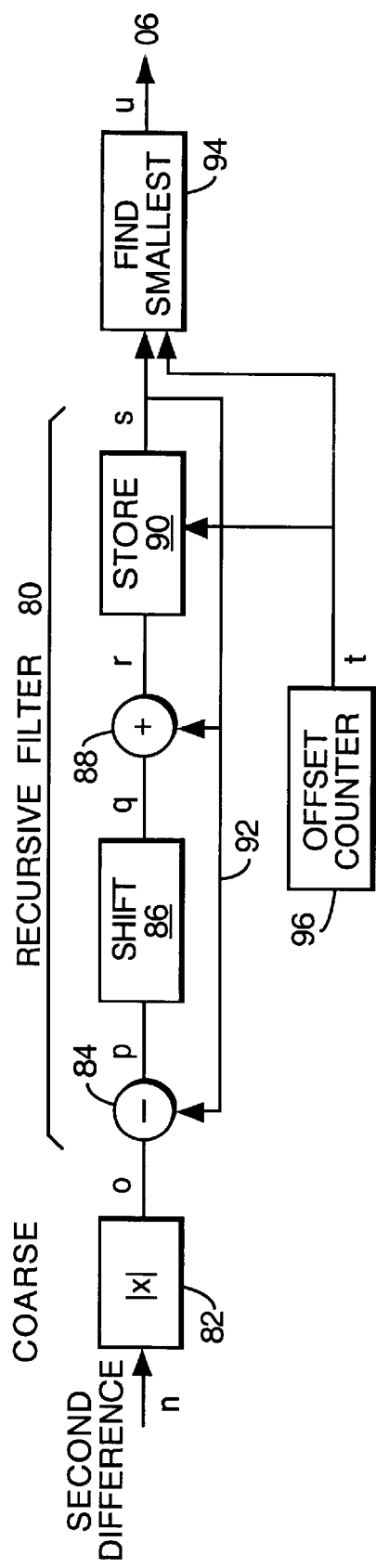
FIG. 6 is a detailed block diagram of coarse AFC control.

Coarse AFC (FIG. 6)

Referring to FIG. 6, the coarse AFC employs a bank of recursive filters 80, only one of which is shown. The magnitude of the second difference $\psi$ (obtained from subtractor unit 58) is obtained in unit 82 and applied to filter 80 comprising subtractor 84, shift register 86, summer 88 and store 90, and a feedback loop 92 to summer 88 and subtractor 84. The output of the filter is compared at 94 with the output of an offset converter 96. The smaller value is provided as coarse frequency correction. Thus the coarse AFC uses a bank of the recursive filters $\gamma\Delta(l,n)$ in which each value of $\Delta$ corresponds to a different trial frequency offset. The search range is given by $-47 \leq \Delta \leq 47$. Each filter is updated only when the current slot would contain a continual pilot for its particular value of $\Delta$. The input to all of the filters is the rectified value of the second difference of phase. This will have a small average value only for the correct offset, because the first difference will be similar each time. The update rule is:

$$\gamma_\Delta = \begin{cases} (1-R)\gamma_\Delta(l, n-1) + R|\psi(l,n)| & (n-N_0 - \Delta) \in C_R \\ \gamma_\Delta(l, n-1) & \text{otherwise} \end{cases}$$

where $C_R$ is a subset of C chosen such that at most one store needs to be updated for each slot. The store which needs to be updated, if any, is the one for which $\Delta = n - N_0 - N_C$, where $N_C \in C_R$.

After all of the filter stores have been updated for a given CP, the coarse AFC output is set to the value of $\Delta$ corresponding to the store containing the smallest value:

$$\Delta_C = \operatorname*{argmin}_\Delta \gamma_\Delta$$

The algorithm can be expressed as follows:

```
if((n-N₀ + 47)∈ C_R &&sweep=false)
{
    Δ = -47;
    sweep=true;
    γ_min = 0.5;
    Δ_min = 0;
}
if (sweep)
{
    γ_Δ = (1-R)γ_Δ+R|ψ|;
    if (γ_Δ<γ_min)
    {
        γ_min = γ_Δ;
        Δ_min = Δ;
    }
    Δ = Δ + 1;
    if (Δ>47)
    {
        sweep=false;
        Δ_c = Δ_min;
    }
}
``` where the flag sweep starts with the value false.

Two methods are used for combining coarse and fine measurement.

METHOD 1

This method simply adds the two measures together, since the coarse measure is an integer giving the number of whole carriers offset, while the fine measure gives fractions of a carrier.

$$E = \Delta_c + \phi_w$$

METHOD 2

In this method the fine part is only considered if the coarse value is zero. The coarse value is also clipped to the range −1 to +1:

$$E = \begin{cases} -1 & \Delta_c < 0 \\ \phi_w & \Delta_c \equiv 0 \\ 1 & \Delta_c > 0 \end{cases}$$

The frequency error value E is fed into a loop filter, which consists simply of an integrator:

$$v(l)=v(l-1)+E|_{n-N_{max}}$$

The integrator is clocked once per symbol, at the end of the symbol. This value is fed to a DAC which can be used to generate the AFC control voltage if analog AFC is being used. The value is also fed to the DDFS if digital AFC is being used.

Common-Phase-Error Correction

The common-phase error signal is derived only from the fine part of the AFC signal. This signal represents the change of phase from one symbol to the next. In order to correct the common-phase-error it is necessary to know the actual rotation, not just the change in rotation. It is therefore necessary to accumulate the phase differences (with whole rotations discarded):

$$\theta_{CPE}(l)=[\theta_{CPE}(l-1)+\phi_W(l)] \bmod 1.0$$

The whole symbol is now rotated by this angle in the opposite direction. The correction value will not be available until the whole symbol has been received and therefore the correction must be delayed appropriately and applied to the delayed data paths:

$$c'(l-1,n)=c(l-1,n)\exp[-j\theta_{CPE}(l-1)]$$

$$c'(l-2,n)=c(l-2,n)\exp[-j\theta_{CPE(l-2)}]$$

Figure 5:
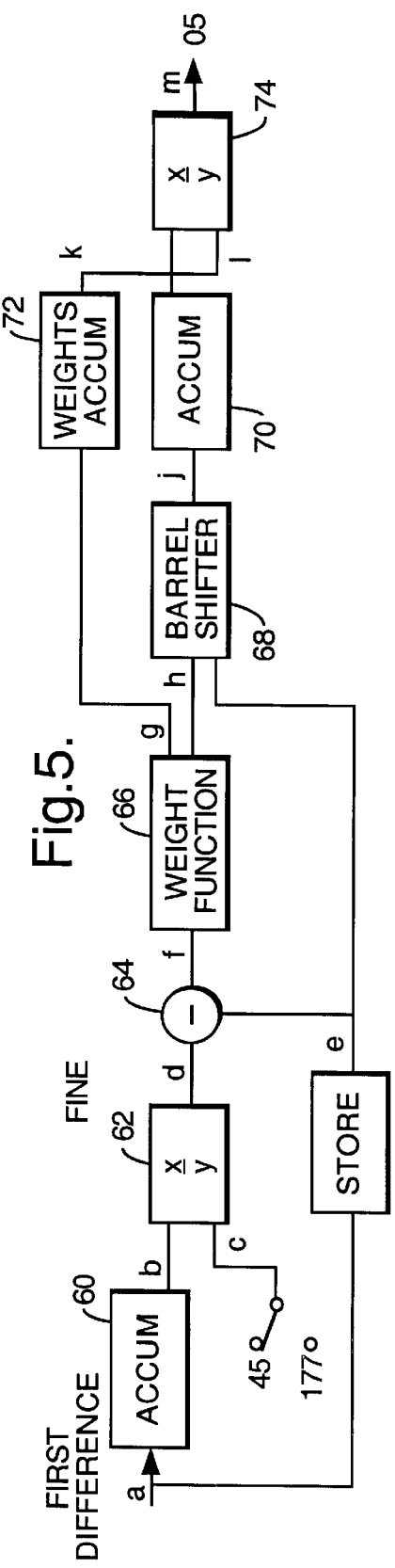
FIG. 5 is a detailed block diagram of CPE/fine AFC control.
Figure 7:
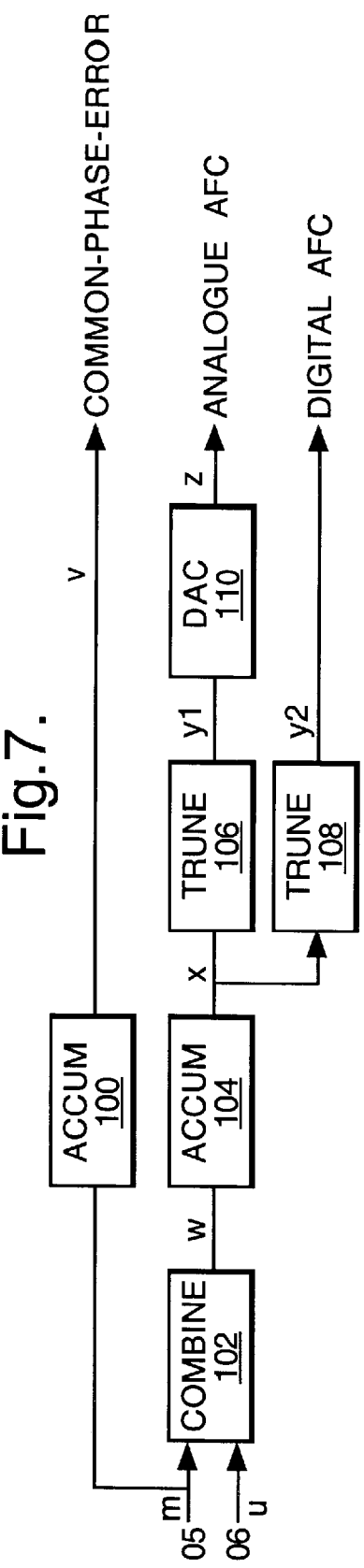
FIG. 7 is a block diagram of a circuit for providing CPE and AFC control from the circuits of FIGS. 5 and 6.

Referring now to FIG. 7, this shows a circuit for receiving the outputs of the circuits of FIGS. 5 and 6. The output O5 from FIG. 5 is applied to an accumulator 100 which provides a common-phase-error signal. The signal O5 is also applied to a combining circuit 102 here it is combined with the output O6 from FIG. 6 in order to provide a summed signal which is applied to an accumulator 104. The output of accumulator 104 is applied to truncation circuits 106, 108. The output from truncation circuit 108 may be used for digital automatic frequency control where the signal is applied to a DDFS circuit at the input of FFT unit 24; alternatively the output from truncation circuit 106 is applied to a pulse width modulation digital to analog converter circuit 110 in order to provide a signal for analog automatic frequency control where the frequency of a local oscillator in the downconverter stage is controlled.

Referring back to FIG. 4, the common-phase-error signal from FIG. 7 is applied to the delayed versions of the symbols from FFT 24 as at 181, 182 and the corrected versions of the symbols are then fed to a linear interpolator 184 for channel equalisation. The symbol from delay element 52 is applied directly to the interpolator, whereas the stored symbol from element 54 is applied to further delay elements 186, 188 connected to tappings 190 of the interpolator. In use, the elements 52, 54, 186, 188 comprise one and the same memory elements, by arranging the common-phase-error correction and channel equalisation to take place in different phases of operation of the demodulator.

What is claimed is:

1. An apparatus for demodulating digital broadcast signals comprising data modulated on a multiplicity of spaced carrier frequencies, comprising:

analog-to-digital conversion means for providing a series of digital samples of the broadcast signal;

real-to-complex conversion means for converting each digital sample to a complex number value;

Fourier Transform means for analyzing the complex number values to provide a series of data signal values in complex number format for each carrier frequency; and signal processing means for processing the series of data signal values including phase error correcting means;

said phase error correcting means including means for converting the data signal values from a complex number format to a phase angle format, means for determining a common phase error by assessing the phase of continual pilot signals in the broadcast signals and determining the variation in phase of the continual pilot signals between consecutive symbols in the broadcast signals, and means for subtracting the common phase error from the data signal values.

2. An apparatus according to claim 1, including means for averaging the phase of a plurality of the continual pilot signals, and weighting means for applying a weighting to the pilot signals so that more significance is accorded to pilot signals near the average value of phase error.

3. An apparatus according to claim 1, including automatic frequency control means responsive to the output from the Fourier Transform means for controlling the frequency of the signal applied to an input of the Fourier Transform means, the automatic frequency control means including a coarse frequency control and a fine frequency control, wherein the fine frequency control shares the aforesaid elements of the common phase error correcting means.

4. An apparatus according to claim 1, including a plurality of delay elements for storing previous versions of symbol values, and including a channel equalization means, including a second plurality of storage elements for storing previous versions of the symbol values, wherein the common phase error determination and the channel equalization means operate in different phases of operation of the apparatus, thereby to permit one and the same memory elements to serve as said first and second plurality of delay elements.

5. An apparatus for demodulating digital broadcast signals comprising data modulated on a multiplicity of spaced carrier frequencies, comprising:

analog-to-digital conversion means for providing a series of digital samples of the broadcast signal;

Fourier Transform means for analyzing the samples to provide a series of data signal values for each carrier frequency; and signal processing means for processing the series of data signal values including phase error correcting means;

said phase error correcting means including, means for determining a common phase error by assessing the phase of continual pilot signals in the broadcast signals and determining the variation in phase of the continual pilot signals between consecutive symbols in the broadcast signals, and means for subtracting the common phase error from the data signal values, wherein the common phase error determining means includes means for averaging the phase of a plurality of said continual pilot signals, and weighting means for applying a weighting to the pilot signals so that more significance is accorded to pilot signals near the average value of phase error.

6. An apparatus according to claim 5, including automatic frequency control means responsive to the output from the Fourier Transform means for controlling the frequency of the signal applied to the input of the Fourier Transform means, the automatic frequency control means including a coarse frequency control and a fine frequency control, wherein the fine frequency control shares the aforesaid elements of the common phase error correcting means.

7. An apparatus according to claim 6, wherein the automatic frequency control means is arranged to be applied to a down-conversion stage or via a DDFS to an input of the Fourier Transform means.

8. An apparatus according to claim 5, wherein the coarse frequency control comprises a recursive filter responsive to the rate of change of determined phase error, and means for comparing the output of the rate of change with a frequency offset.

9. An apparatus according to claim 5, including a plurality of delay elements for storing previous versions of symbol values, and including a channel equalization means, including a second plurality of storage elements for storing previous versions of the symbol values, wherein the common phase error determination and the channel equalization means operate in different phases of operation of the apparatus, thereby to permit one and the same memory elements to serve as said first and second plurality of delay elements.

10. An apparatus for demodulating digital video broadcast signals comprising data modulated on a multiplicity of spaced carrier frequencies, comprising:

analog-to-digital conversion means for providing a series of digital samples of the broadcast signal;

Fourier Transform means for analyzing the samples to provide a series of data signal values for each carrier frequency;

signal processing means for processing the series of data signal values including phase-error-correcting means; and automatic frequency control means for controlling the frequency of the signals input to the Fourier Transform means;

wherein both the phase-error-correcting means and the automatic frequency control means employ a common phase error determination means comprising means for assessing the phase of a plurality of continual pilot signals in the broadcast signals, and determining the variation in phase of the continual pilot signals between consecutive symbols in the broadcast signals in order to derive a common phase error and a frequency error signal.

11. An apparatus according to claim 8, including means for averaging the phase of a plurality of the continual pilot signals, and weighting means for applying a weight to the pilot signals so that more significance is accorded to pilot signals near the average value of phase error.

12. An apparatus according to claim 9, including a plurality of delay elements for storing previous versions of symbol values, and including a channel equalization means, including a second plurality of storage elements for storing previous versions of the symbol values, wherein the common phase error determination and the channel equalization means operate in different phases of operation of the apparatus, thereby to permit one and the same memory elements to serve as said first and second plurality of delay elements.

13. An apparatus according to claim 10, wherein said apparatus is incorporated in an integrated circuit chip.

14. An apparatus according to claim 1, wherein said apparatus is incorporated in an integrated circuit chip.

15. An apparatus according to claim 5, wherein said apparatus is incorporated in an integrated circuit chip.

16. A method for demodulating digital broadcast signals comprising data modulated on a multiplicity of spaced carrier frequencies, the method comprising:

analog-to-digital conversion for providing a series of digital samples of the broadcast signal;

converting each digital sample to a complex number value;

an analyzing the complex number values to provide a series of Fourier Transform data signal values in complex number format for each carrier frequency;

processing the series of data signal values including phase error correction, the phase error correction including converting the data signal values from a complex number format to a phase angle format;

determining a common phase error by assessing the phase of continual pilot signals in the broadcast signals and determining the variation in phase of the continual pilot signals between consecutive symbols in the broadcast signals; and subtracting the common phase error from the data signal values.

17. A method for demodulating digital broadcast signals comprising data modulated on a multiplicity of spaced carrier frequencies, the method comprising:

analog-to-digital conversion for providing a series of digital samples of the broadcast signal;

analyzing the samples to provide a series of Fourier Transform data signal values for each carrier frequency;

processing the series of data signal values including phase error correction, the phase error correction including determining a common phase error by assessing the phase of continual pilot signals in the broadcast signals and determining the variation in phase of the continual pilot signals between consecutive symbols in the broadcast signals; and subtracting the common phase error from the data signal values, wherein the common phase error determination includes averaging the phase of a plurality of the continual pilot signals and applying a weighting to the pilot signals so that more significance is accorded to pilot signals near the average value of phase error.

18. A method for demodulating digital video broadcast signals comprising data modulated on a multiplicity of spaced carrier frequencies, the method comprising:

analog-to-digital conversion for providing a series of digital samples of the broadcast signal;

analyzing the samples to provide a series of Fourier Transform data signal values for each carrier frequency;

processing the series of data signal values including phase-error-correction; and automatic frequency control for controlling the frequency of the signals used in the analyzing of the samples;

wherein both the phase error-correction and the automatic frequency control employ a common phase error determination comprising assessing the phase of a plurality of continual pilot signals in the broadcast signals and determining the variation in phase of the continual pilot signals between consecutive symbols in the broadcast signals in order to derive a common phase error and a frequency error signal.

* * * * *